(12) United States Patent
Chandra et al.

(10) Patent No.: US 8,295,214 B2
(45) Date of Patent: Oct. 23, 2012

(54) REDUCING TRANSMIT SIGNAL COMPONENTS OF A RECEIVE SIGNAL OF A TRANSCEIVER

(75) Inventors: Gaurav Chandra, Santa Clara, CA (US); Moshe Malkin, Mountain View, CA (US); Dariush Dabiri, San Jose, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 429 days.

(21) Appl. No.: 12/765,097

(22) Filed: Apr. 22, 2010

(65) Prior Publication Data

US 2011/0261863 A1  Oct. 27, 2011

(51) Int. Cl.
*H04B 3/20* (2006.01)

(52) U.S. Cl. ........................................ 370/286

(58) Field of Classification Search ................. None
See application file for complete search history.

(56) References Cited

U.S. PATENT DOCUMENTS

| | | |
|---|---|---|
| 5,166,924 A | 11/1992 | Moose |
| 5,787,113 A | 7/1998 | Chow et al. |
| 6,785,384 B2 * | 8/2004 | Wang .................. 379/406.1 |
| 6,856,191 B2 | 2/2005 | Bartuni |
| 6,859,531 B1 * | 2/2005 | Deisher ............... 379/406.05 |
| 6,934,387 B1 | 8/2005 | Kim |
| 6,946,983 B2 | 9/2005 | Andersson et al. |
| 6,980,644 B1 * | 12/2005 | Sallaway et al. ............ 379/391 |
| 7,027,591 B2 * | 4/2006 | Cairns .................. 379/406.05 |
| 2002/0067824 A1 * | 6/2002 | Wang .................. 379/406.06 |
| 2003/0206579 A1 | 11/2003 | Bryant |
| 2004/0114542 A1 * | 6/2004 | Stopler .................... 370/286 |
| 2004/0213170 A1 * | 10/2004 | Bremer .................... 370/282 |
| 2005/0220185 A1 | 10/2005 | Dowling |
| 2007/0009017 A1 * | 1/2007 | Lin et al. ................... 375/219 |
| 2007/0132626 A1 * | 6/2007 | Hurrell .................... 341/155 |
| 2007/0211794 A1 * | 9/2007 | Dabiri et al. ............... 375/219 |
| 2008/0233903 A1 * | 9/2008 | Dabiri et al. ............. 455/115.1 |
| 2009/0073903 A1 * | 3/2009 | Clara et al. ................. 370/286 |
| 2010/0104091 A1 * | 4/2010 | Yue et al. .............. 379/406.08 |
| 2011/0310936 A1 * | 12/2011 | Malkin et al. ............. 375/219 |

* cited by examiner

*Primary Examiner* — Otis L Thompson, Jr.
(74) *Attorney, Agent, or Firm* — Brian R. Short

(57) ABSTRACT

Embodiments of a method and apparatus of reducing transmit signal components of a receive signal of a transceiver are disclosed. One method includes generating a transmit signal by passing a pre-driver transmit signal through a transmit driver. An echo cancellation signal is generated by passing the pre-driver transmit signal through an echo cancellation driver. A residual echo signal is generated by passing a pre-driver residual echo cancellation signal through a residual echo cancellation driver. The transceiver simultaneously transmits the transmit signal, and receiving the receive signal. At least a portion of an echo signal of the receive signal is canceled by summing the echo cancellation signal with the receive signal. At least another portion of the cancellation echo signal of the receive signal is canceled by summing the residual echo cancellation signal with the receive signal.

30 Claims, 9 Drawing Sheets

REDUCING TRANSMIT SIGNAL COMPONENTS OF A RECEIVE SIGNAL OF A TRANSCEIVER

FIELD OF THE INVENTION

The invention relates generally to network communications. More particularly, the invention relates to methods and apparatuses for reducing transmit signal components of a receive signal of a transceiver.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

One result of full duplex transmission is that the transmit signals share the same transmission channel as the receive signals, and some of the transmit signal processing shares at least some electronic circuitry with receive processing. Non-linearities of transmit signals can be generated within the transmitter section of the transceiver, and at least some of the non-linearities can be imposed onto the receive signal. The result is distortion of the receive signal.

Full duplex transmission can result in at least a portion of the transmit signal being coupled back into the receive signal. The portion of the transmit signal that couples back is referred to as an echo signal. Linear portions of the echo signal can be canceled by subtracting an approximate echo signal from the received signal. Generation of the echo cancellation signal, and cancellation process can also introduce non-linearities which can be imposed on the receive signal. The result is additional distortion of the receive signal.

Additionally, the receive signal itself can introduce non-linearities. For example, the receiver section typically includes an ADC which converts the analog receive signal into a digital stream. This ADC can introduce receive signal non-linearity.

It is desirable to have an apparatus and method of reducing transmit signal components of a receive signal of a transceiver.

SUMMARY OF THE INVENTION

An embodiment includes a method of reducing transmit signal components of a receive signal of a transceiver. The method includes generating a transmit signal by passing a pre-driver transmit signal through a transmit driver. An echo cancellation signal is generated by passing the pre-driver transmit signal through an echo cancellation driver. A residual echo cancellation signal is generated by passing a pre-driver residual echo cancellation signal through a residual echo cancellation driver. The transceiver simultaneously transmits the transmit signal, and receiving the receive signal. At least a portion of the receive signal is canceled by summing the echo cancellation signal with the receive signal. At least another portion of the receive signal is canceled by summing the residual echo cancellation signal with the receive signal.

Another embodiment includes a transceiver. The transceiver includes a transmit DAC operative to receive a pre-driver transmit signal, and generate a transmit signal, an echo DAC operative to receive the pre-driver transmit signal, and generate an echo cancellation signal, and a residual DAC operative to generate a residual echo cancellation signal by passing a pre-driver residual signal through a residual driver. The transceiver simultaneously transmits the transmit signal, and receives the receive signal. A canceller is operative to cancel at least a portion of the receive signal by summing the echo cancellation signal with the receive signal. A second canceller is operative to cancel at least another portion of the receive signal by summing the residual echo cancellation signal with the receive signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

Figure 1:
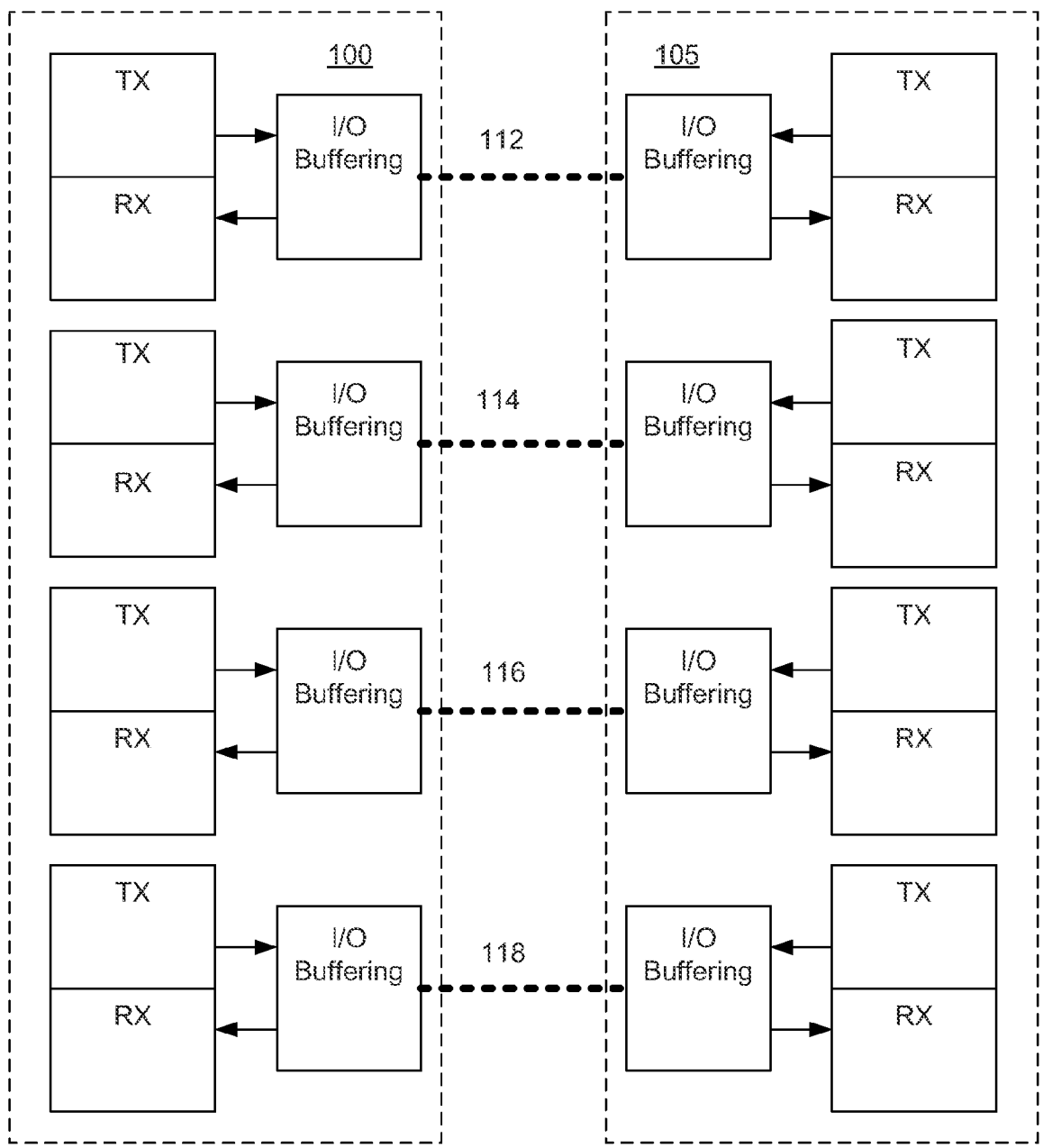
FIG. 1 shows a plurality of prior art Ethernet transceiver pairs.

As shown in the drawings for purposes of illustration, the invention is embodied in an apparatus and methods for reducing transmit signal components of a receive signal of a transceiver. The descriptions provided are generally focused on Ethernet transceivers, but the described embodiments can be used in other configurations of transceivers as well.

Figure 2:
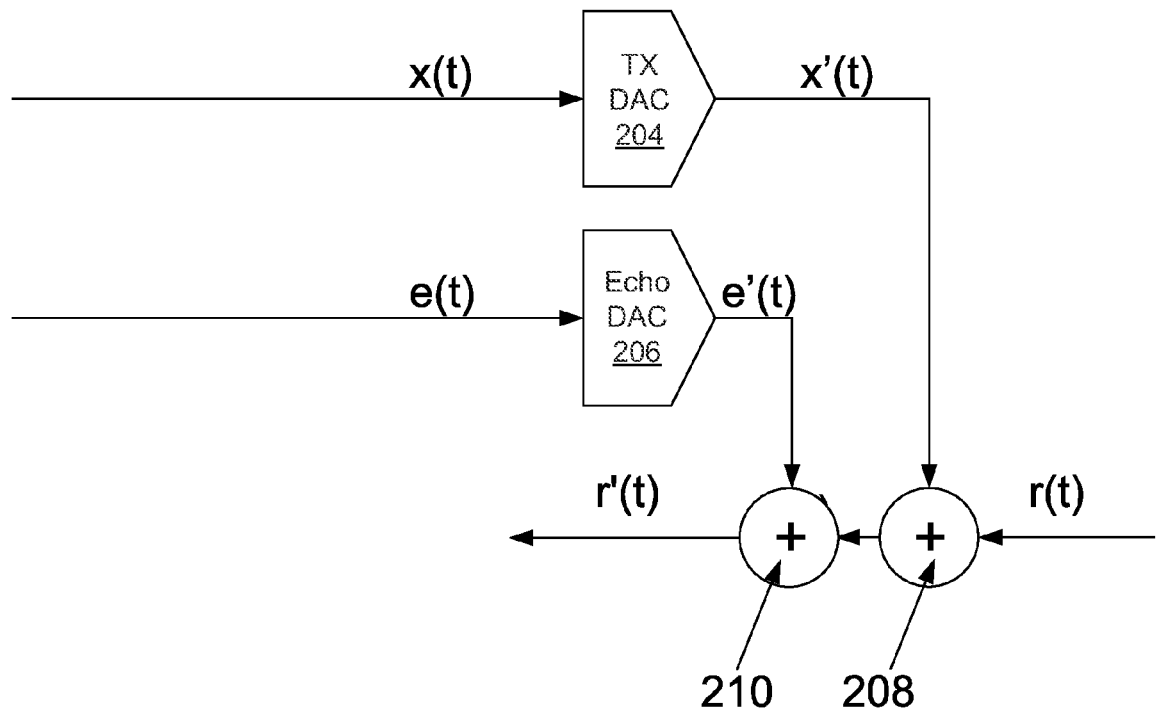
FIG. 2 shows a block diagram of one example of a transceiver that can utilizes methods of reducing transmit signal components of a receive signal of a transceiver.

An embodiment of a full duplex transceiver is shown in FIG. 2. As shown in FIG. 2, signal x(t) is the transmit signal, which is transmitted on, for example, an Ethernet cable. However, x(t) (designated as x'(t) after passing through the transmit DAC 204) is also injected in the receive signal path due to full duplex nature of the transmission, and hence added to the receive signal r(t). Signal e(t) is the echo signal that is generated from another (usually a replica) transmitter, and is subtracted from the received signal. The signal e(t) is approximately similar to the signal x(t) but not necessarily the same, because it may include additional terms such as processed versions of other cross talk signals, and other correction terms for the echo introduced by the termination circuitry. Embodiments include the Signal e'(t) (after passing through the echo DAC 206) being generated such that the resulting residual signal r'(t) is free of the transmit signal and possibly other impairments such as cross-talk. As shown, the post TXDAC x'(t) is summed with r(t) at summer 208, and e'(t) is summed with the result at summer 210, resulting in r'(t).

Since in general, the echo signal e'(t) can be different from the transmit signal x'(t), the distortion introduced by TXDAC 204 is not necessarily correlated with the distortion generated by the echo DAC 206. Hence for robust system performance both of these drivers have to be individually designed for very good linear performance (very low distortion), so as to not impact the overall system budget for acceptable distortion. This poses stringent requirements in terms of design, and impacts area and power of the overall solution.

Figure 3:
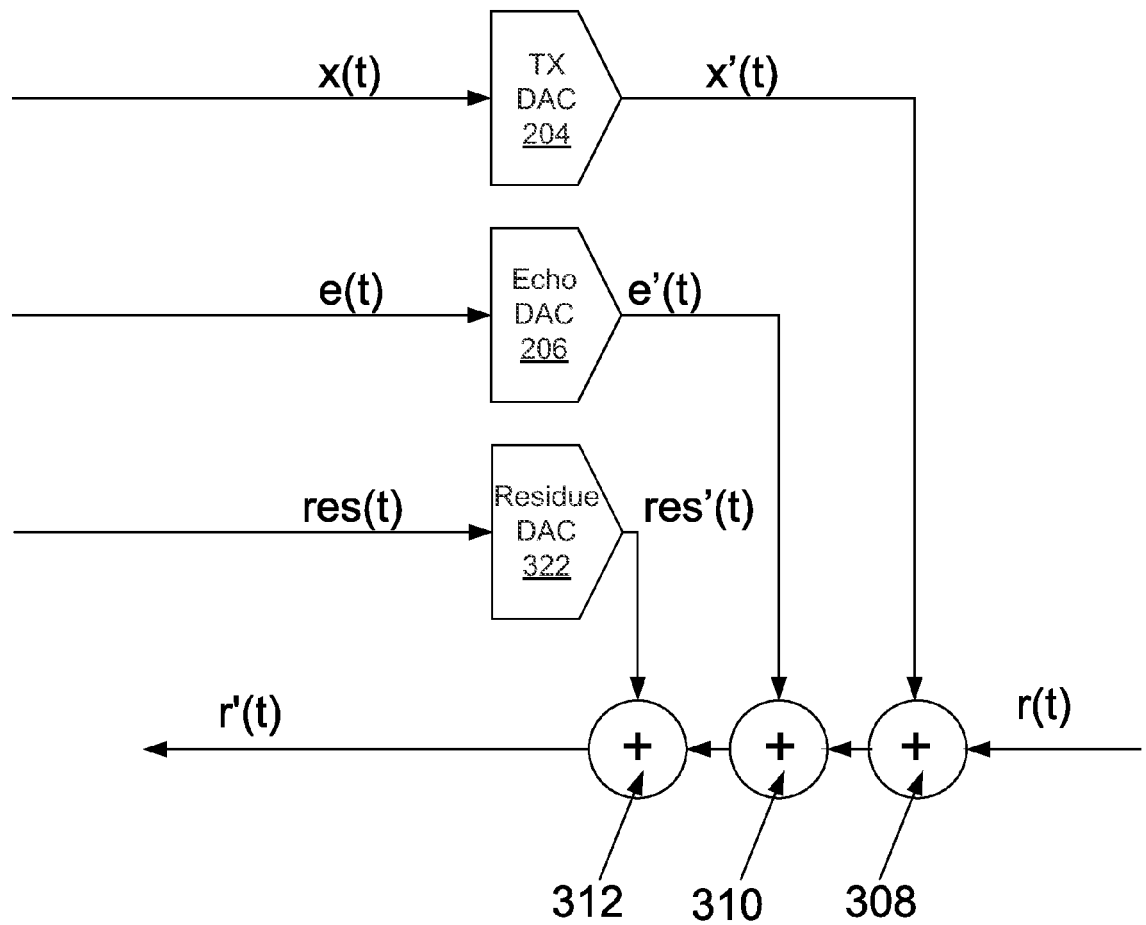
FIG. 3 shows a block diagram of another example of a transceiver that can utilized methods of reducing transmit signal components of a receive signal of a transceiver.

FIG. 3 shows a block diagram of another example of a transceiver that can utilized methods of reducing transmit signal components of a receive signal of a transceiver. This embodiment further includes a residue DAC 322 which results in improved distortion performance.

As noted, the echo signal e(t) is similar to TX signal x(t), but not necessarily identical. Hence, the non-linear distortion generated by the echo path is not correlated to the distortion generated by the TX path. Conceptually, this can be depicted by expressing the signal e(t) as a sum of two signals:

$$e(t)=res(t)+x(t)$$

Where:

$$res(t)=e(t)-x(t).$$

That is, the echo signal e(t) is decomposed as a sum of the original transmit signal x(t), and a residual signal res(t), which is only the difference of e(t) and x(t). Since e(t) is similar to x(t), the residual term res(t) is quite small. A third separate driver (Residual DAC 322) is additionally included in FIG. 3 to generate this additional term which can be subtracted at the input of the receiver (summer 312). Summation other signals x'(t), e'(t) with r(t) are depict by summers 308, 310.

As shown in FIG. 3, the input receive signal r(t) contains distortion contributions from three different drivers (204, 206, 322) as opposed to two (204, 206). However, this is an improvement over the embodiment of FIG. 2 for several reasons. First, the distortion generated by the TX DAC 204 is now highly correlated to EC DAC 206, because the input signals are the same (x(t)=e(t)). In one embodiment, these two drivers can be made completely identical, and hence the distortion generated by these paths will completely cancel. Second, the distortion generated by the third driver (Residue DAC 322) is negligible because the residual signal res(t) is much smaller than the signal x(t). Since the power of residual signal is small, the resultant distortion level generated by the Residue DAC 322 is quite negligible.

It can also be observed that the addition of the Residue DAC 322 also improves echo cancellation. In general, the composition of echo signal e(t) is designed so as to achieve maximum echo cancellation at the receiver input, and hence minimize the power of the signal coming at the input of the receiver. However, one constraint imposed on the composition of echo signal e(t) is the update rate of the signal in time domain, also referred to as the sampling rate of the echo signal. As suggested by the Nyquist sampling theorem, the maximum bandwidth of the signal e(t) can be no more than half of the sampling rate. That is, if the transmit symbol duration is $T_s$, then the transmission sampling rate $F_s$ can be defined as:

$$F_s=1/T_s$$

Then the maximum signal bandwidth of the echo signal is defined as:

$$F_{bw}=F_s/2$$

This constraint limits the amount of cancellation that can be achieved at the input of receiver. More specifically, any signals coming at the input of the receiver which are outside the maximum bandwidth of the echo signal e(t), will not be cancelled.

For the embodiment shown in FIG. 2, the way to overcome this problem is to increase the sampling rate of the echo signal e(t). However, this leads to increased power dissipation and increased area, which is undesirable. However, in the proposed embodiment shown in FIG. 3, the signal e(t) is decomposed into signals x(t) and res(t), with separate drivers. The driver Echo DAC 206 generates the signal x'(t)(x'(t)=e'(t)) which has the same signal bandwidth as the TX DAC 204, and does not need to run at higher sampling rate. But the sampling rate of the Residue DAC 322 can be increased to cancel additional terms that include high-frequency terms outside the maximum effectively controllable bandwidth of the Echo DAC 206. As mentioned earlier, the residual signal res(t) is much smaller than the signal x(t) or the signal e(t) shown in FIG. 2. Therefore, the area or power penalty of operating the Residue DAC 322 at a higher sampling rate is much smaller than operating the entire Echo DAC 206 (as shown in FIG. 2) at a high data rate. As will be described, other embodiments relate to how a higher frequency Echo DAC clock can be realized.

Figure 4:
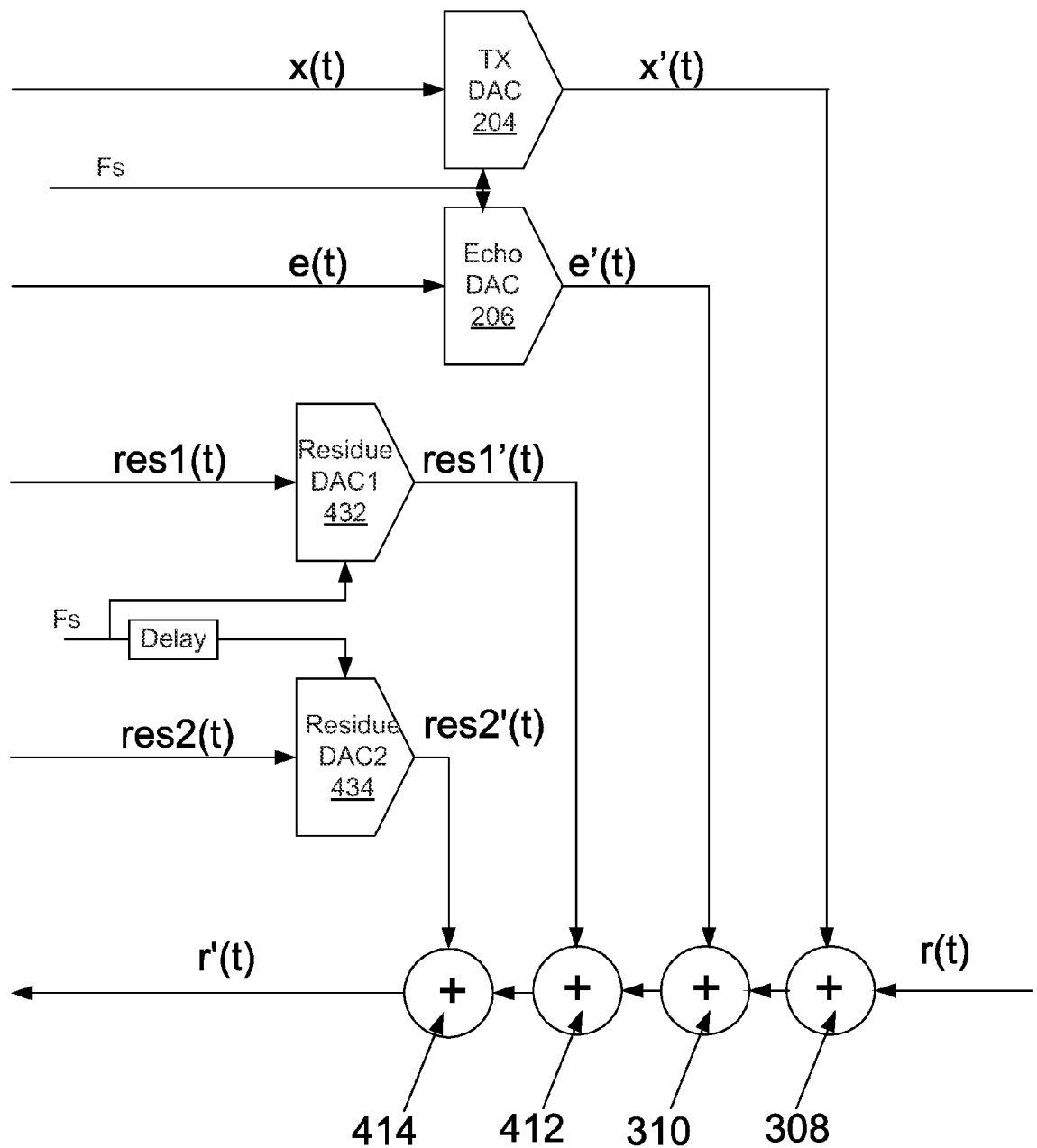
FIG. 4 shows a block diagram of another example of a transceiver that can utilized methods of reducing transmit signal components of a receive signal of a transceiver.

FIG. 4 shows a block diagram of another example of a transceiver that can utilized methods of reducing transmit signal components of a receive signal of a transceiver. This embodiment includes a first residue DAC1 432 and a second residue DAC2 434. The combination of the first residue DAC1 432 and the second residue DAC2 434 can be used to realize an effective doubling of the sampling rate (Fs) of each of the DACs. That is, for example, the clock of the first residue DAC1 432 can be inverted and then used to clock the second residue DAC2 434. If sampling of the DACs occurs on the rising edges of the clocks, the combined output of the first residue DAC1 432 and the second residue DAC2 434 is twice the rate of the sampling clock Fs.

The opposite phase of the same clock is easily obtained by an inversion of the clock locally, and does not require any modification in the top level clock distribution network. The phase difference between the clocks of the first residue DAC1 432 and the second residue DAC2 434 is shown as a delay of the clock Fs in FIG. 4.

Figure 5:
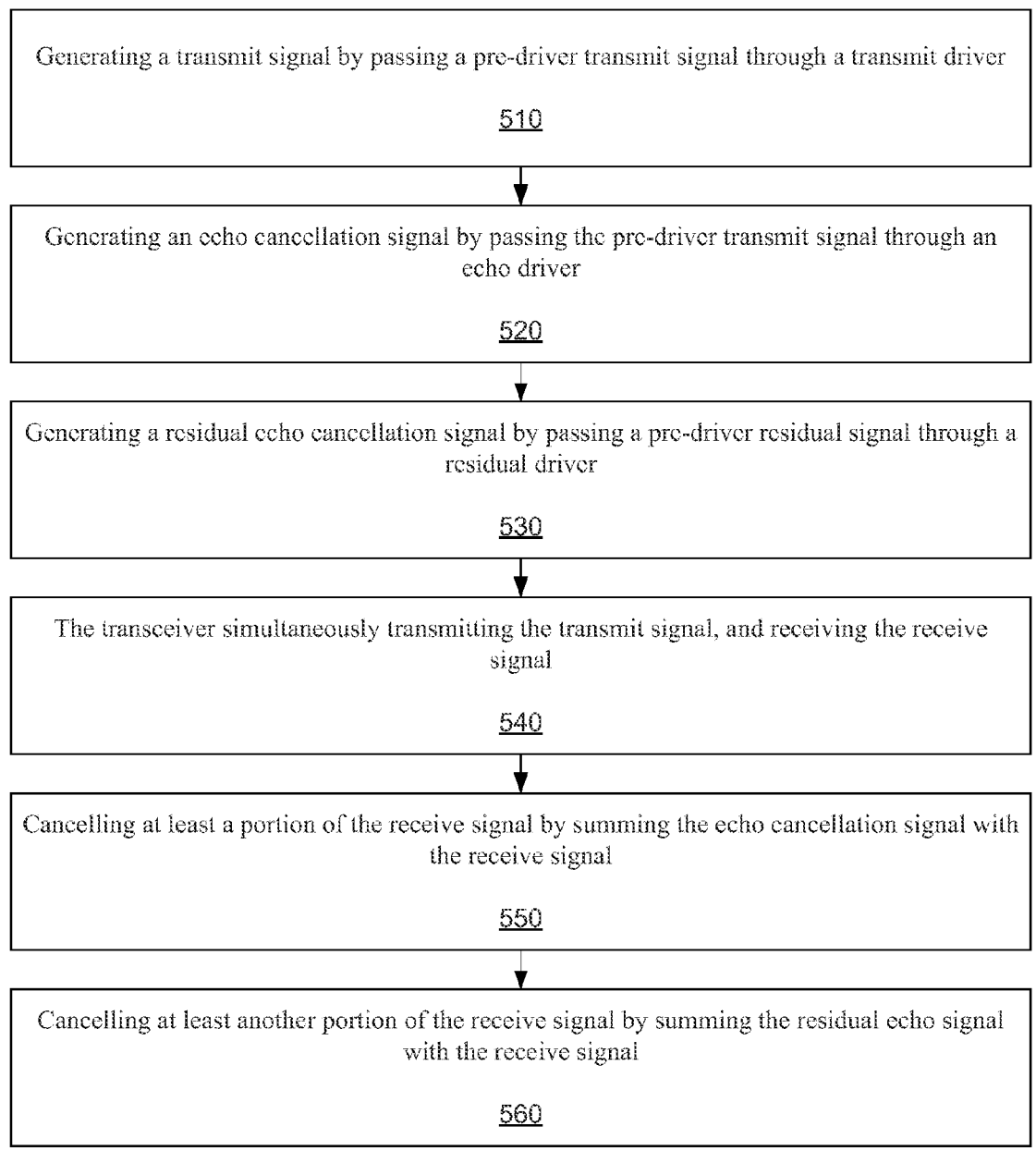
FIG. 5 is a flow chart that includes steps of one example of a method of reducing transmit signal components of a receive signal of a transceiver.

FIG. 5 is a flow chart that includes steps of one example of a method of reducing transmit signal components of a receive signal of a transceiver. A first step 510 includes generating a transmit signal by passing a pre-driver transmit signal through a transmit driver. A second step 520 includes generating an echo cancellation signal by passing the pre-driver transmit signal through an echo driver. A third step 530 includes generating a residual echo cancellation signal by passing a pre-driver residual signal through a residual driver. A fourth step 540 includes the transceiver simultaneously transmitting the transmit signal, and receiving the receive signal. A fifth step 550 includes cancelling at least a portion of the receive signal by summing the echo cancellation signal with the receive signal. A sixth step 560 includes cancelling at least another portion of the receive signal by summing the residual echo cancellation signal with the receive signal.

An embodiment includes generating the pre-driver residual echo cancellation signal as a function of the pre-driver transmit signal. For an embodiment, the pre-driver residual echo cancellation signal is generated by processing the pre-driver transmit signal. More specifically, the pre-driver residual echo cancellation signal can be generated by a linear transform of the pre-driver transmit signal. For example, the pre-driver residual echo cancellation signal can be generated by linear filtering of the pre-driver transmit signal. For one embodiment, the filter that filters the pre-driver transmit signal includes a finite impulse response linear filter, which generates the pre-driver residual echo cancellation signal as a linear transformation of the pre-driver transmit signal.

Figure 8:
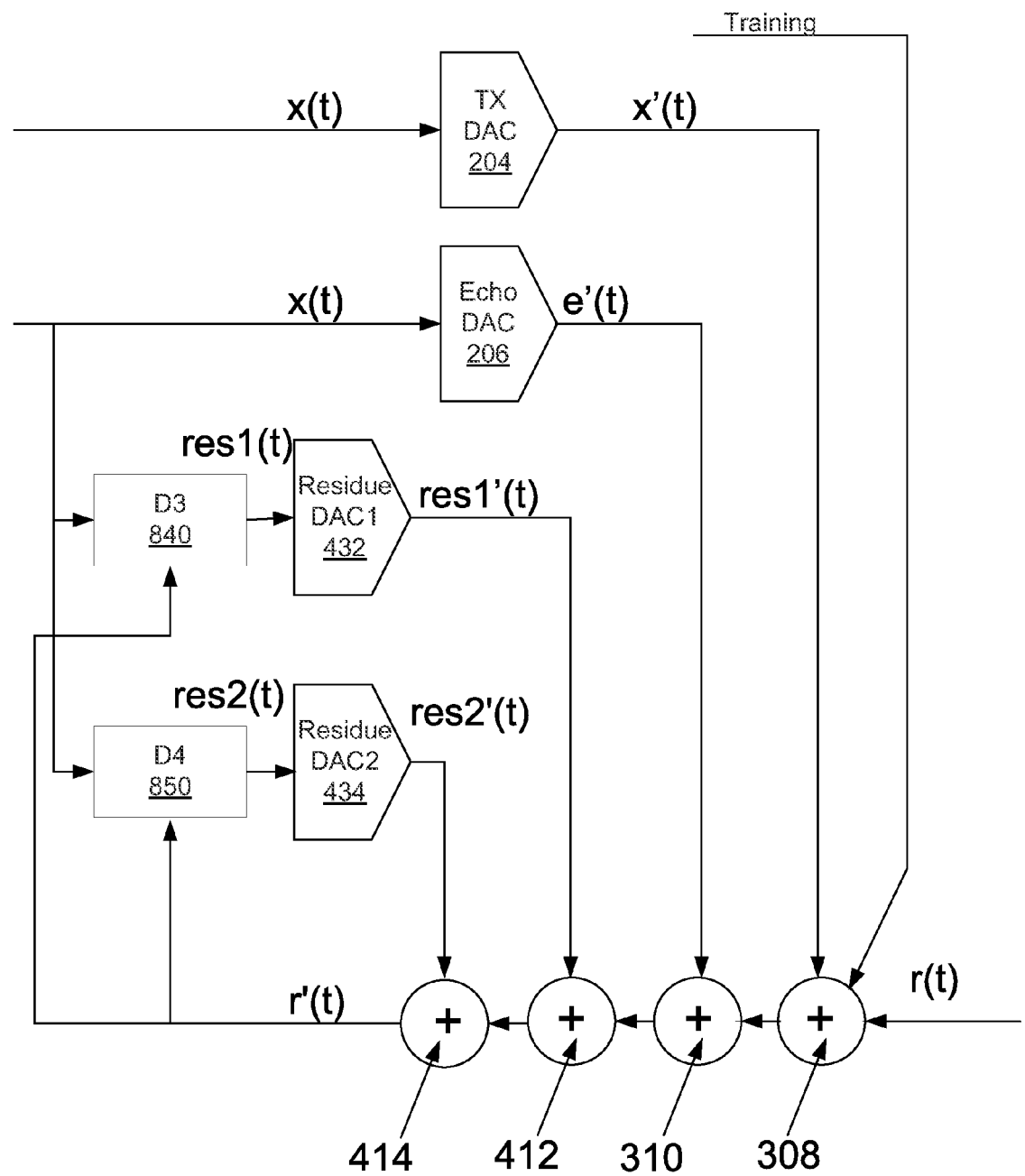
FIG. 8 shows a block diagram of another example of a transceiver that can utilized methods of reducing transmit signal components of a receive signal of a transceiver.

For an embodiment, the filter that performs the filtering is adaptively trained based on at least one of the receive signal, and a training signal that is included with the receive signal. The training signal can be generated within the transceiver and summed with the receive signal (as shown in FIG. 8). Filter coefficients (tap values) of the filter can be adaptively trained with the receive signal, wherein for an embodiment, the receive signal includes the training signal.

For an embodiment, the filter is adapted based upon samples of the receive signal r'(t) which can also include the training signal. For a more specific embodiment, the filter adaptation is based on the receive signal r'(t) being sampled at a higher sampling frequency than the sampling frequency Fs. This allows the filter to generate the pre-driver residual echo cancellation signal so that the residual echo cancellation signal reduces the receive signal level at a sampling frequency that is higher than the sampling frequency of, for example, the residual cancellation DAC and/or the receive ADC. This allows the residual echo cancellation driver to reduce the receive signal level over a higher bandwidth than the ADC bandwidth, and so reduce the non-linear distortion caused by higher frequency components of the receive signal.

Additionally, the filter coefficients can be determined based on the receive signal and also based on limiting a peak value of the pre-driver residual echo cancellation signal. Ideally, a peak value of the pre-driver residual echo cancellation signal is minimized, thereby minimizing the distortion of the residual echo cancellation driver (which is typically a DAC). Limiting the peak value of the pre-driver residual echo cancellation signal allows for generating a residual echo cancellation signal using a residual echo cancellation DAC that is smaller and/or has a small reference voltage.

As previously shown and described, embodiments of the transmit driver, the echo driver and the residual driver each include a digital to analog converter (DAC). The transmit DAC and the echo DAC can include sampling frequencies of Fs, and the residual DAC can include a sampling frequency Fres that is different than Fs. More specifically, the sampling frequency Fres can be greater than Fs.

As previously described, the residual echo signal is substantially smaller in magnitude than the pre-driver transmit signal and the estimated echo signal. This enables an embodiment that includes the residual DAC being physically smaller than the transmit DAC and the echo DAC. Additionally, the residual DAC can have a reference voltage that is less than reference voltages of the transmit DAC the echo DAC.

For an embodiment, the residual DAC generates the residual echo cancellation signal based on a different number of bits than the transmit DAC uses to generate the transmit signal and the echo DAC uses to generate the echo cancellation signal. Generating the residual echo cancellation signal using less bits simplifies the DAC design but still allows for efficient reduction of the receive signal level. In this embodiment, the possible distortion introduced by using a different number of bits to generate the residual echo cancellation signal is corrected digitally by the receiver.

As previously shown and described, the echo DAC can include a first and a second residual driver (residual DAC1, residual DAC2), and therefore, generate a second residual echo cancellation signal by passing the residual signal through the second residual driver. Embodiments include the second residual driver including a DAC, and further include sampling frequencies of the residual DAC and the second residual DAC being Fs (the same sampling frequency as the TXDAC and the Echo DAC). A more specific embodiment includes sampling of the residual DAC occurring on either a rising edge or a falling edge of its sampling, and sampling of the second residual DAC occurring on the other of the rising edge or the falling edge of its sampling, thereby providing an effective doubling of the sampling rate of the residual echo cancellation signals.

As with the pre-driver residual echo cancellation signal, the second pre-driver residual echo cancellation signal can be generated by processing the pre-driver transmit signal. For an embodiment, processing the pre-driver transmit signal includes filtering the pre-driver transmit signal, generating both the pre-driver residual echo cancellation signal and the second pre-driver residual echo cancellation signal. Similar to previously described embodiments, the processing can include generating the pre-driver residual echo cancellation signals for each residual echo cancellation driver as a linear transformation of the pre-driver transmit signal. The processing can include filtering the pre-driver transmit signal with linear filters, which are jointly designed to reduce the receive signal level. More specifically, filters that generate the residual pre-driver echo cancellation signal and the second residual pre-driver echo cancellation signal, are jointly designed to based on the receive signal and for limiting peak values of the pre-driver residual echo cancellation signal and the second pre-driver residual echo cancellation signal. For another embodiment, the filters are jointly designed to reduce the receive signal level at a sampling frequency that is higher than the sampling frequency of, for example, the residual echo cancellation driver and the second residual echo cancellation driver and/or the receive ADC.

Figure 6:
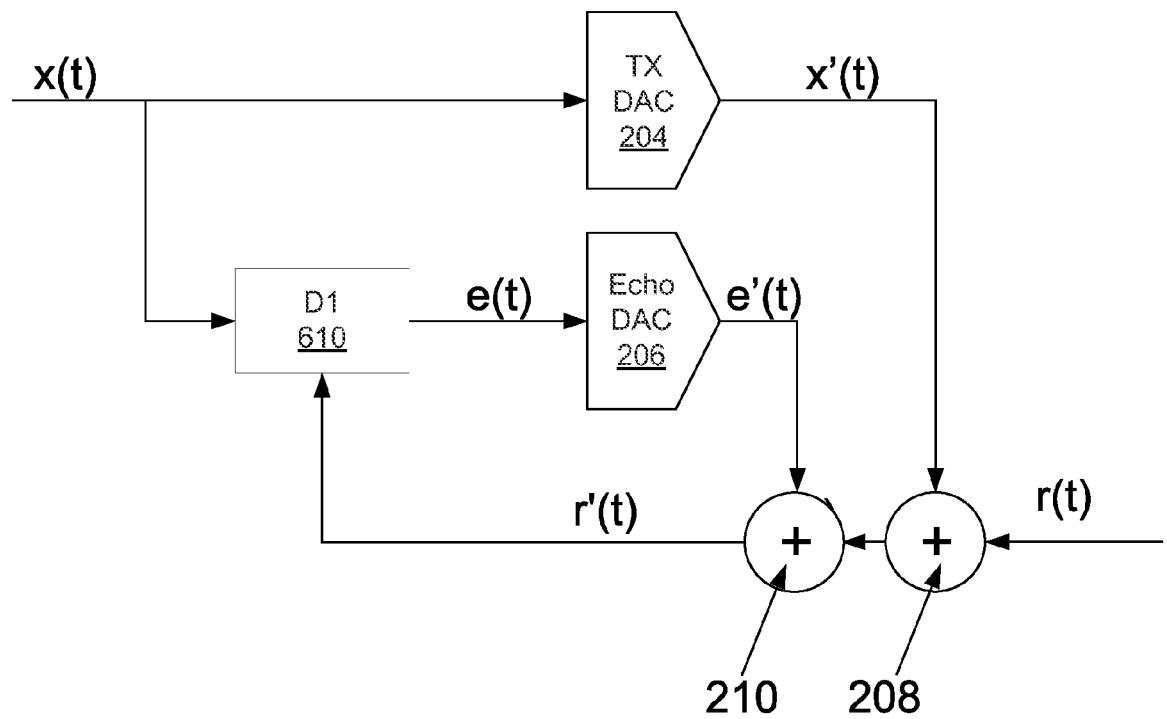
FIG. 6 shows a block diagram of one example of a transceiver that can utilizes methods of reducing transmit signal components of a receive signal of a transceiver.

FIG. 6 shows a block diagram of one example of a transceiver that can utilizes methods of reducing transmit signal components of a receive signal of a transceiver. This embodiment is similar to the embodiment of FIG. 2, but additionally includes a digital signal processing (DSP) block D1 610. The DSP block 610 can be calibrated using the receive signal r'(t). As will be described, embodiments of the DSP block 610 includes adaptive filtering, wherein filter coefficients of the filtering are determined based upon the receive signal, and/or training signal included with the receive signal.

Figure 7:
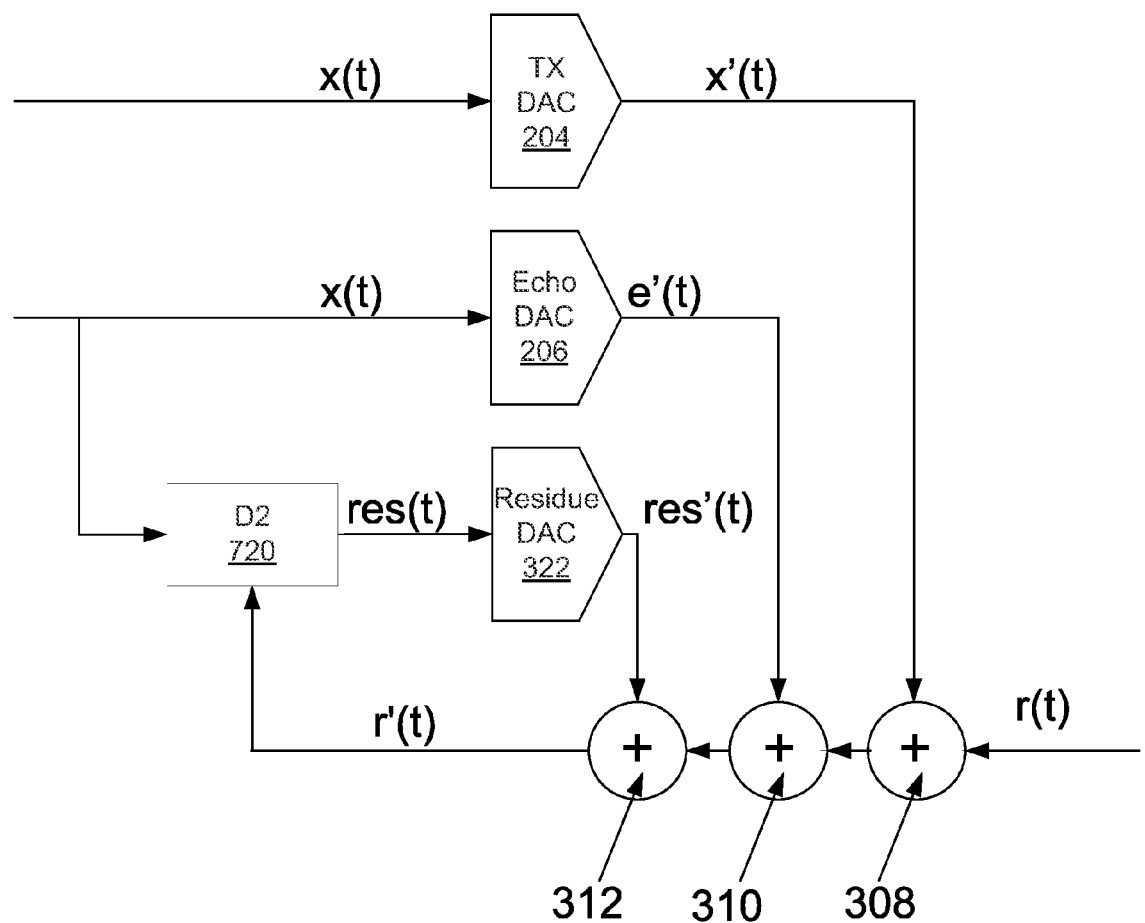
FIG. 7 shows a block diagram of another example of a transceiver that can utilized methods of reducing transmit signal components of a receive signal of a transceiver.

FIG. 7 shows a block diagram of another example of a transceiver that can utilized methods of reducing transmit signal components of a receive signal of a transceiver. This embodiment is similar to the embodiment of FIG. 3, but additionally includes a digital signal processing (DSP) block D2 720. The DSP block 720 can be calibrated using the receive signal C(t).

Embodiments of the DSP block 720 include the previously describe methods and filtering for generating the pre-driver residual echo signal as a function of the pre-driver transmit signal. A specific embodiment of the DSP block 720 includes a filter. One embodiment of the filter provides linear filtering of the pre-driver transmit signal. For an embodiment, the filter that performs the filtering is adaptively trained based on at least one of the receive signal, and a training signal that is included with the receive signal. The training signal can be generated within the transceiver and summed with the receive signal. Filter coefficients (tap values) of the filter can be adaptively trained with the receive signal, wherein the receive signal includes the training signal.

For an embodiment, the filter is adapted based upon samples of the receive signal r'(t) which can also include the training signal. For a more specific embodiment, the filter adaptation is based on the receive signal r'(t) sampled at a higher sampling frequency than the sampling frequency Fs. This allows the filter to generate the pre-driver residual echo cancellation signal to reduce the receive signal level over a higher bandwidth than the receive ADC bandwidth.

Additionally, the filter coefficients can be determined based on the receive signal and also based on limiting a peak value of the pre-driver residual echo cancellation signal. Ideally, a peak value of the pre-driver residual echo cancellation signal is minimized, which thereby minimizes distortion of the echo cancellation driver (which is typically a DAC).

FIG. 8 shows a block diagram of another example of a transceiver that can utilized methods of reducing transmit signal components of a receive signal of a transceiver. This embodiment is similar to the embodiment of FIG. 4, but additionally includes a digital signal processing (DSP) blocks D3, D4 840, 850. The DSP blocks D3, D4 840, 850 can be calibrated using the receive signal r'(t).

For an embodiment, the DSP blocks D3, D4 840, 850 provide joint filtering of the pre-driver transmit signal, generating both the pre-driver residual echo cancellation signal res1(t) and the second pre-driver residual echo cancellation signal res2(t). Similar to previously described embodiments, the processing can include generating the pre-driver residual echo cancellation signals for each residual echo cancellation driver 432, 434 as a linear transformation of the pre-driver transmit signal. The processing can include filtering the pre-driver transmit signal with linear filters, which are jointly designed to reduce the receive signal level. More specifically, filters that generate the residual pre-driver echo cancellation signal and the second residual pre-driver echo cancellation signal, are jointly designed based on the receive signal and to limit peak values of the pre-driver residual echo cancellation signal and the second pre-driver residual echo cancellation signal. For another embodiment, the filters are jointly designed to result in a residual echo cancellation signal that reduces the receive signal level at a higher sampling frequency than the sampling frequency of, for example, the residual echo cancellation DACs and/or the receive ADC.

FIG. 8 shows an example of how the training signal can be combined with the receive signal for the purpose of adaptively updating, for example, filter coefficients within the digital signal processing (DSP) blocks D3, D4 840, 850.

A Network of Devices

Figure 9:
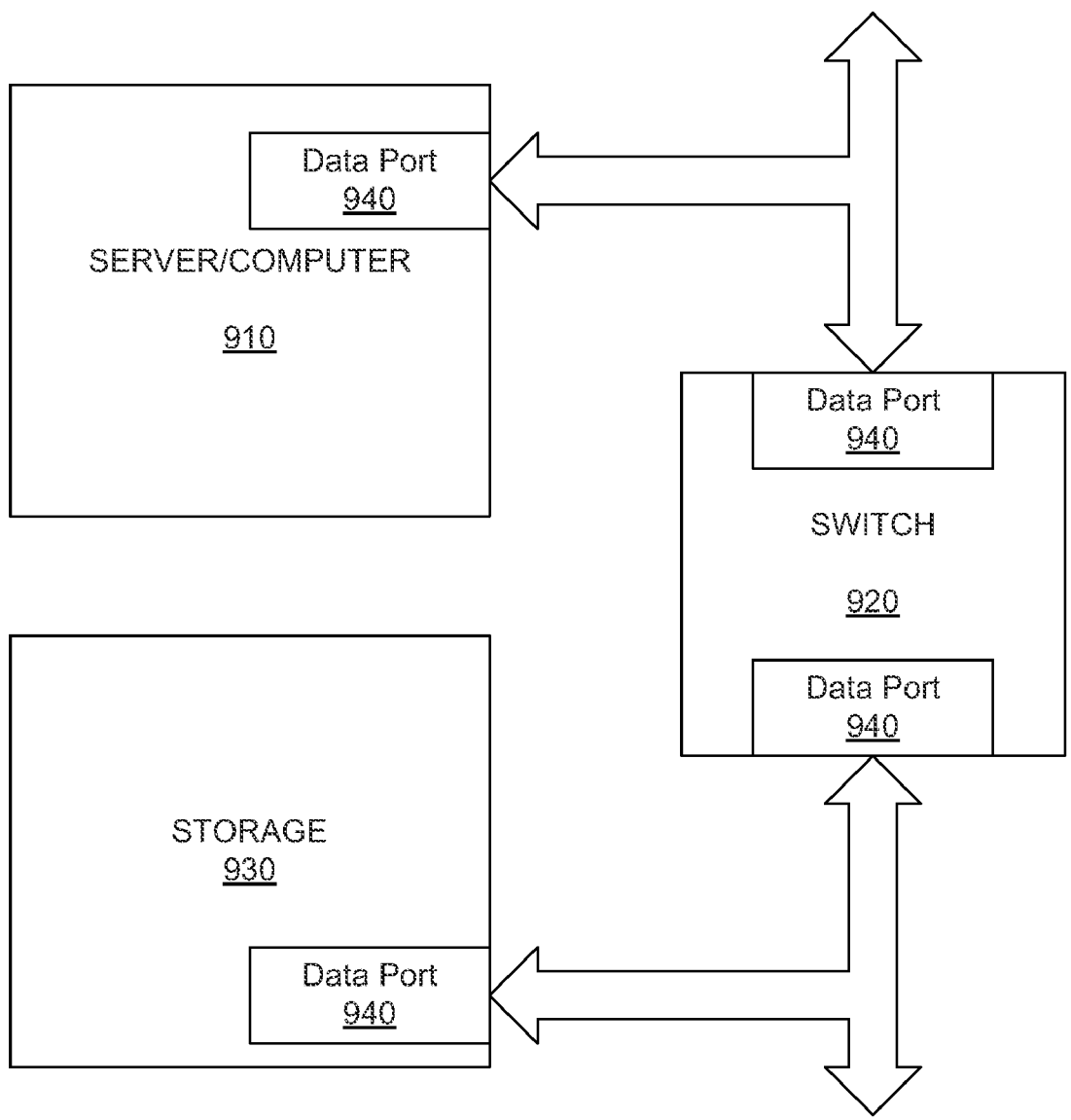
FIG. 9 shows devices connected to an Ethernet network that can include embodiments of reducing transmit signal components of a receive signal of a transceiver.

FIG. 9 shows devices connected to an Ethernet network that can include embodiments of reducing transmit signal components of a receive signal of a transceiver. The network includes a server/computer 910, a switch 920 and storage 930 that can all benefit from reducing transmit signal components of a receive signal of a transceiver 940. The server/computer 910 can be connected to the switch 920 through an Ethernet twisted pair LAN connection. The switch 920 can additionally be connected to the storage 930 through an Ethernet twisted pair LAN connection. The transceivers 940 within the server/computer 910, the switch 920, and the storage 930 can provide cancelation of transmit signal components of receive signals.

Although specific embodiments of the invention have been described and illustrated, the invention is not to be limited to the specific forms or arrangements of parts so described and illustrated. The invention is limited only by the appended claims.

What is claimed:

1. A method of reducing transmit signal components of a receive signal of a transceiver, the method comprising:
   a transmit driver generating a transmit signal based on a pre-driver transmit signal;
   an echo cancellation driver generating an echo cancellation signal based on the pre-driver transmit signal;
   a residual echo cancellation driver generating a residual echo cancellation signal based on a pre-driver residual echo cancellation signal;
   the transceiver simultaneously transmitting the transmit signal, and receiving the receive signal;
   cancelling at least a portion of the receive signal by summing the echo cancellation signal with the receive signal;
   cancelling at least another portion of the receive signal by summing the residual echo cancellation signal with the receive signal.

2. The method of claim 1, further comprising generating the pre-driver residual echo cancellation signal, wherein generating the pre-driver residual echo cancellation signal comprises generating the pre-driver residual echo cancellation signal as a function of the pre-driver transmit signal.

3. The method of claim 2, wherein generating the pre-driver residual echo cancellation signal comprises filtering the pre-driver transmit signal.

4. The method of claim 3, wherein a filter that performs the filtering is adaptively trained based on at least one of the receive signal, and a training signal that is included with the receive signal.

5. The method of claim 4, wherein the filter adaptation is based on the receive signal r'(t) sampled at a higher sampling frequency than the sampling frequency Fs.

6. The method of claim 4, wherein the filter coefficients are determined based on the receive signal and also based on limiting a peak value of the pre-driver residual echo cancellation signal.

7. The method of claim 1, wherein the transmit driver, the echo cancellation driver and the residual echo cancellation driver each comprise a digital to analog converter (DAC).

8. The method of claim 7, wherein the transmit DAC and the echo DAC comprise sampling frequencies of Fs.

9. The method of claim 8, wherein the residual DAC comprises a sampling frequency Fres that is different than Fs.

10. The method of claim 9, wherein the sampling frequency Fres is greater than Fs.

11. The method of claim 5, wherein the residual DAC generates the residual echo cancellation signal based on a different number of bits than the transmit DAC uses to generate the transmit signal and the echo DAC uses to generate the echo cancellation signal.

12. The method of claim 1, further comprising a second residual echo cancellation driver generating a second residual echo cancellation signal based on a second pre-driver residual echo cancellation signal.

13. The method of claim 12, further comprising generating the second pre-driver residual echo cancellation signal, wherein generating the second pre-driver residual echo cancellation signal comprises processing the pre-driver transmit signal.

14. The method of claim 13, wherein processing the pre-driver transmit signal comprises filtering the pre-driver transmit signal, generating both the pre-driver residual echo cancellation signal and the second pre-driver residual echo cancellation signal.

15. The method of claim 14, wherein filters that generate the pre-driver residual echo cancellation signal and the second pre-driver residual echo cancellation signal, are jointly designed based on the receive signal and based on limiting peak values of the pre-driver residual echo cancellation signal and the second pre-driver residual echo cancellation signal.

16. The method of claim 2, further comprising a plurality of residual echo cancellation drivers generating a plurality of residual echo cancellation signals based on a plurality of pre-driver residual echo cancellation signals.

17. The method of claim 16, wherein the second residual echo cancellation driver comprises a second residual DAC, and further comprising sampling frequencies of the residual DAC and the second residual DAC being Fs.

18. The method of claim 17, wherein sampling of the residual DAC occurs at a different phase of the sampling frequency Fs than the sampling of the second residual DAC.

19. The method of claim 18, wherein sampling of the residual DAC occurs on either a rising edge or a falling edge of the sampling frequency Fs, and sampling of the second residual DAC occurs on the other of the rising edge or the falling edge of the sampling frequency Fs.

20. The method of claim 17, wherein sampling of the plurality of residual echo cancellation drivers occur at a plurality of phases of a sampling frequency Fs.

21. The method of claim 20, wherein the plurality of residual echo cancellation drivers comprise a plurality of sampling frequencies.

22. A transceiver comprising:
a transmit driver generating a transmit signal based on a pre-driver transmit signal;
an echo cancellation driver generating an echo cancellation signal based on the pre-driver transmit signal;
a residual echo cancellation driver generating a residual echo cancellation signal based on a pre-driver residual echo cancellation signal;
the transceiver simultaneously transmitting the transmit signal, and receiving the receive signal;
a canceller operative to cancel at least a portion of an echo signal of the receive signal by summing the echo cancellation signal with the receive signal;
a second canceller operative to cancel at least another portion of the echo signal of the receive signal by summing the residual echo cancellation signal with the receive signal.

23. The transceiver of claim 22, wherein the transmit driver, the echo cancellation driver and the residual echo cancellation driver each comprise a digital to analog converter (DAC).

24. The transceiver of claim 23, wherein the transmit DAC and the echo DAC comprise sampling frequencies of Fs, and wherein the residual DAC comprises a sampling frequency Fres that is greater than Fs.

25. The transceiver of claim 23, wherein the residual DAC is smaller than the transmit DAC and the echo DAC.

26. The transceiver of claim 23, wherein the residual DAC has a reference voltage that is less than the reference voltages of the transmit DAC and the echo DAC.

27. The transceiver of claim 23, wherein the residual echo cancellation DAC comprises fewer bits than the transmit DAC and the echo DAC.

28. The transceiver of claim 23, further comprising a second residual echo cancellation driver generating a second residual echo cancellation signal based on a second pre-driver residual echo cancellation signal.

29. The transceiver of claim 28, wherein the second residual echo cancellation driver comprises a second residual DAC, and further comprising sampling frequencies of the residual DAC and the second residual DAC being Fs.

30. The transceiver of claim 29, wherein sampling of the residual DAC occurs at a different phase of the sampling frequency Fs than the sampling of the second residual DAC, wherein sampling of the residual DAC occurs on either a rising edge or a falling edge of the sampling frequency Fs, and sampling of the second residual DAC occurs on the other of the rising edge or the falling edge of the sampling frequency Fs.

* * * * *